(12) United States Patent
Mindock et al.

(10) Patent No.: US 11,718,424 B2
(45) Date of Patent: Aug. 8, 2023

(54) SPACECRAFT AND SPACECRAFT PROTECTIVE BLANKETS

(71) Applicant: The Boeing Company, Chicago, IL (US)

(72) Inventors: Eric S. Mindock, Playa del Rey, CA (US); Richard W. Aston, Brea, CA (US); Anna Maria Tomzynska-Engers, Seal Beach, CA (US); Raynaldo Santiago, Jr., Hawthorne, CA (US)

(73) Assignee: The Boeing Company, Chicago, IL (US)

( * ) Notice: Subject to any disclaimer, the term of this patent is extended or adjusted under 35 U.S.C. 154(b) by 1360 days.

(21) Appl. No.: 16/387,204

(22) Filed: Apr. 17, 2019

(65) Prior Publication Data

US 2020/0331640 A1 Oct. 22, 2020

(51) Int. Cl.
*B64G 1/58* (2006.01)
*H05B 3/00* (2006.01)
*H05B 3/14* (2006.01)
*H05B 3/34* (2006.01)

(52) U.S. Cl.
CPC ............. *B64G 1/58* (2013.01); *H05B 3/0014* (2013.01); *H05B 3/145* (2013.01); *H05B 3/34* (2013.01); *H05B 2203/011* (2013.01); *H05B 2214/04* (2013.01)

(58) Field of Classification Search
CPC .......... B64G 1/58; B64G 1/50; H05B 3/0014; H05B 3/145; H05B 3/34; H05B 3/342; H05B 3/345; H05B 3/347; H05B 3/0042; H05B 2203/011; H05B 2203/017; H05B 2203/002; H05B 2203/003; H05B 2203/004; H05B 2203/01;
(Continued)

(56) References Cited

U.S. PATENT DOCUMENTS

| 4,489,906 | A | 12/1984 | Fellas |
| 4,923,741 | A | 5/1990 | Kosmo et al. |
| 5,373,305 | A | 12/1994 | Lepore, Jr. et al. |

(Continued)

FOREIGN PATENT DOCUMENTS

| EP | 1529857 | 5/2005 |
| KR | 20130043788 | 5/2013 |

(Continued)

OTHER PUBLICATIONS

Machine-generated English translation of the abstract of KR 20130043788, downloaded from Espacenet.com on Apr. 27, 2016.

*Primary Examiner* — Shawntina T Fuqua
(74) *Attorney, Agent, or Firm* — Kolitch Romano Dascenzo Gates LLC

(57) ABSTRACT

Protective blankets comprise a flexible blanket body and a voltage supply. The flexible blanket body comprises a plurality of sheets of material operatively coupled together to define the flexible blanket body. The plurality of sheets comprises one or more sheets composed at least in part of a carbon nanotube material and at least one sheet composed of a different material. The voltage supply is electrically coupled at least to a first sheet of the one or more sheets composed at least in part of the carbon nanotube material, such that the first sheet defines a resistive heater.

22 Claims, 4 Drawing Sheets

(58) Field of Classification Search
CPC ........ H05B 2203/013; H05B 2203/036; H05B 2214/04; H05B 2214/02
See application file for complete search history.

(56) References Cited

U.S. PATENT DOCUMENTS

| | | | |
|---|---|---|---|
| 5,598,989 | A | 2/1997 | Ross et al. |
| 7,252,890 | B1 | 8/2007 | Wong |
| 8,632,036 | B1 | 1/2014 | Bianca, Jr. et al. |
| 8,664,573 | B2 * | 3/2014 | Shah ................ C04B 35/185 |
| | | | 428/323 |
| 2003/0082332 | A1 | 5/2003 | Hasegawa et al. |
| 2009/0277897 | A1 | 11/2009 | Lashmore et al. |
| 2011/0036828 | A1 * | 2/2011 | Feng .................... H05B 3/342 |
| | | | 219/545 |
| 2013/0233516 | A1 | 9/2013 | Aston et al. |
| 2014/0239124 | A1 | 8/2014 | Aston et al. |
| 2014/0287641 | A1 | 9/2014 | Steiner, III |
| 2015/0366005 | A1 | 12/2015 | Janas et al. |
| 2016/0021704 | A1 * | 1/2016 | Elverud ................. H05B 3/58 |
| | | | 252/502 |
| 2016/0200460 | A1 | 7/2016 | Aston et al. |
| 2016/0221680 | A1 | 8/2016 | Burton et al. |
| 2018/0014357 | A1 * | 1/2018 | Christy .................... H05B 3/03 |
| 2020/0238576 | A1 * | 7/2020 | Christy .................... H05B 3/34 |

FOREIGN PATENT DOCUMENTS

| | | |
|---|---|---|
| WO | WO 2007/001354 | 1/2007 |
| WO | WO 2012/015472 | 2/2012 |

\* cited by examiner

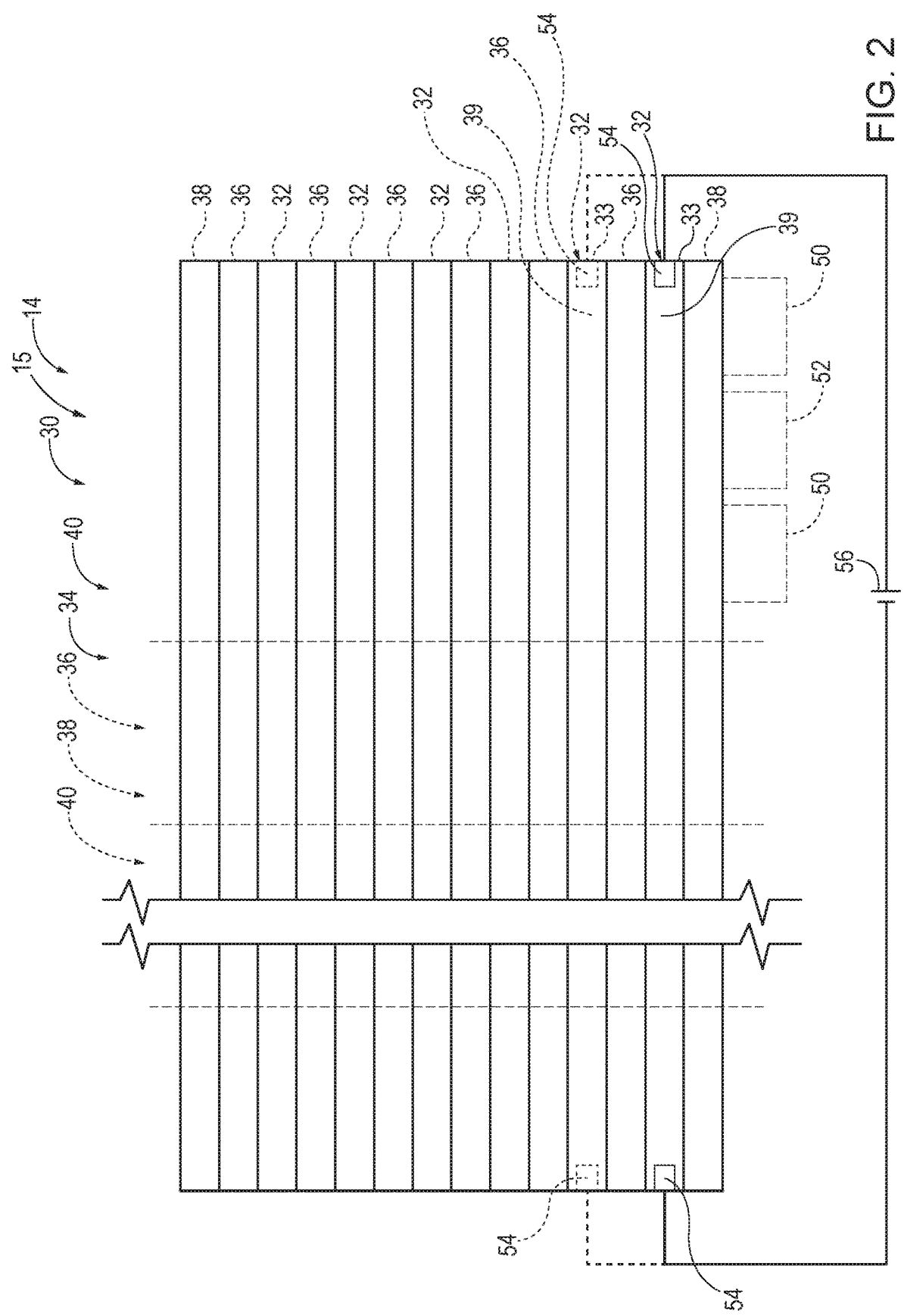

SPACECRAFT AND SPACECRAFT PROTECTIVE BLANKETS

GOVERNMENT RIGHTS

This invention was made with government support under contract number NR0000-15-C-1094 awarded by the National Reconnaissance Office. The government has certain rights in the invention.

FIELD

The present disclosure relates to spacecraft and protective blankets for use on spacecraft.

BACKGROUND

The costs associated with placing spacecraft (e.g., satellites) in orbit are astronomical. For example, in 2014, typical launch costs may be 10's of thousands of U.S. dollars per kilogram of mass, which includes the mass of the launch vehicle and fuel, as well as the mass of the spacecraft being placed in orbit by the launch vehicle. Spacecraft, once in orbit around the Earth or beyond an Earth orbit, are subject to collisions with space debris, both man-made and naturally occurring. Moreover, the payloads of spacecraft typically include electronic equipment, which may be vulnerable to electromagnetic interference (EMI). In addition, spacecraft electronic equipment may be sensitive to extreme temperature and to large temperature gradients. Accordingly, there is a need to reduce the mass of spacecraft, while at the same time ensuring adequate protection of spacecraft against space debris and ensuring adequate protection of electronic equipment from EMI and temperature gradients.

SUMMARY

Protective blankets for spacecraft, flexible blanket bodies thereof, methods of assembling protective blankets, spacecraft, and methods of assembling spacecraft are disclosed herein. Protective blankets comprise a flexible blanket body and a voltage supply. The flexible blanket body comprises a plurality of sheets of material operatively coupled together to define the flexible blanket body. The plurality of sheets comprises one or more sheets composed at least in part of a carbon nanotube material and at least one sheet composed of a different material. The voltage supply is electrically coupled at least to a first sheet of the one or more sheets composed at least in part of the carbon nanotube material, such that the first sheet defines a resistive heater.

BRIEF DESCRIPTION OF THE DRAWINGS

FIG. 2 is a schematic representation of protective blankets according to the present disclosure.

DESCRIPTION

Protective blankets for spacecraft, flexible blanket bodies thereof, methods of assembling protective blankets, spacecraft, and methods of assembling spacecraft are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
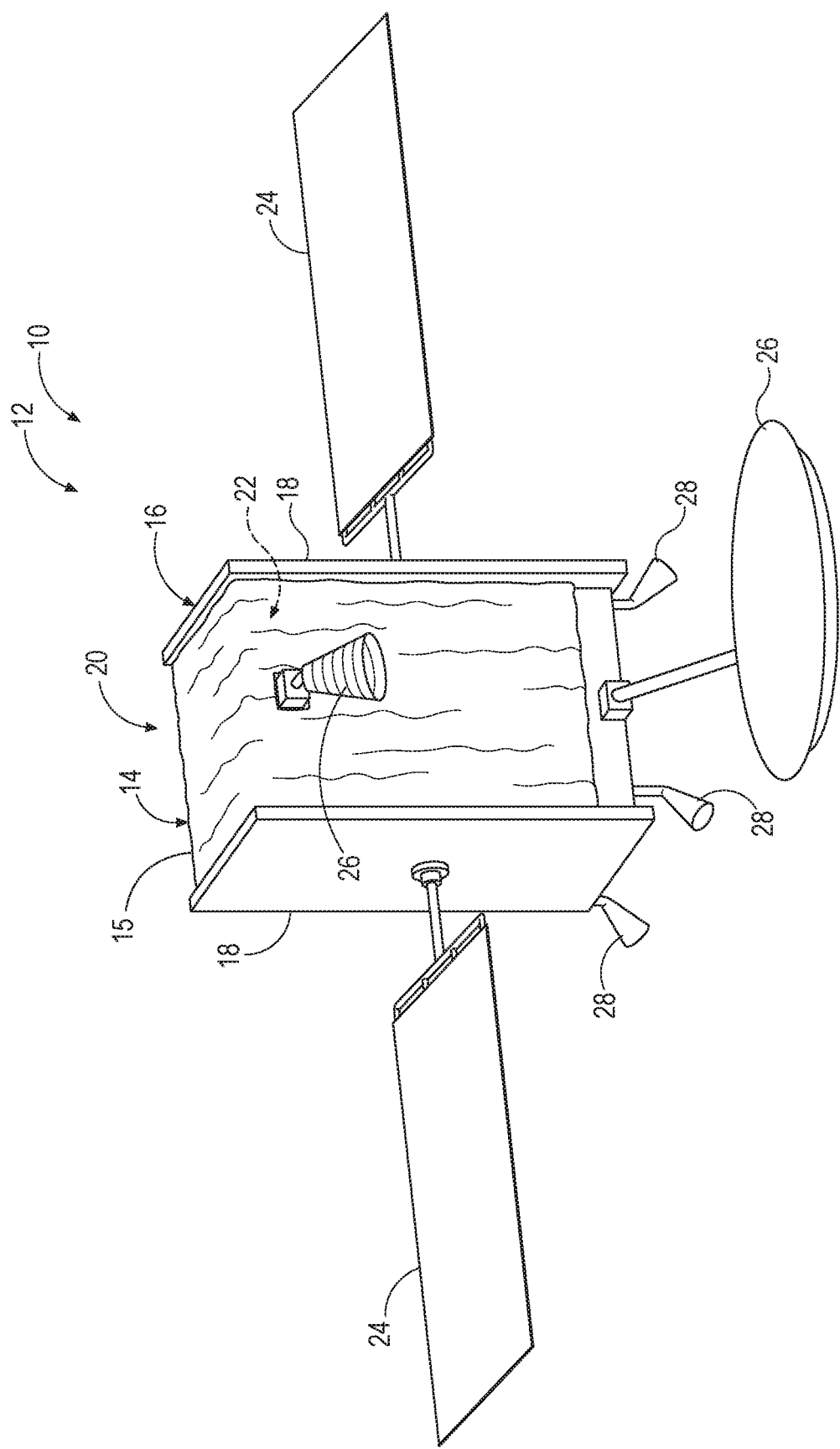
FIG. 1 is an isometric view of an example spacecraft including a protective blanket according to the present disclosure.

FIG. 1 illustrates an example spacecraft 10 in the form of a satellite 12 that comprises a protective blanket 14. However, other types of spacecraft 10 are within the scope of the present disclosure, and protective blankets 14 are not limited to being used with satellites, let alone the example satellite 12 illustrated in FIG. 1 and described herein. Spacecraft 10, and therefore satellites 12, include a spacecraft body 16 and a protective blanket 14 operatively coupled to the spacecraft body 16. In some examples, the spacecraft body 16 may be described as a rigid body and may comprise external appendages. In the illustrated example of satellite 12, the spacecraft body 16 comprises two spaced-apart radiator panels 18 that define a volume 20 between the two spaced-apart radiator panels 18, with the flexible blanket body 15 of the protective blanket 14 generally wrapped around and enclosing the volume 20. However, a protective blanket 14 also may be to enclose individual components or hardware of a spacecraft 10, including internal components of a spacecraft 10.

FIG. 2 schematically represents example protective blankets 14. Protective blankets 14 comprise a flexible blanket body 15 and a voltage supply 56, such as a battery or batteries. The flexible blanket body 15 comprises a plurality of sheets 30 of material that are operatively coupled together to define the flexible blanket body 15. In FIG. 2, the flexible blanket body 15 is schematically illustrated with fourteen sheets 30 of material; however, flexible blanket bodies 15 are not limited to having fourteen sheets 30, and flexible blanket bodies 15 may comprise any suitable number of sheets 30, including fewer than fourteen sheets 30 and greater than fourteen sheets 30.

Flexible blanket bodies 15 are flexible, in so far as they are configured to be wrapped around rigid, or other, structure of a spacecraft 10, and thus to selectively and generally conform to an underlying structure or structure to which the flexible blanket body 15 is operatively attached. When used with a satellite 12, as illustrated in FIG. 1, the flexible blanket body 15 may extend at least partially around and at least partially enclose the volume 20 defined between the two spaced-apart radiator panels 18, and may be operatively coupled to the spacecraft body 16. In some examples, the voltage supply 56 is mounted within the volume 20. Typically, the volume 20 of a satellite 12 also will comprise payload 22, such as electronic equipment, communications equipment, power equipment, and/or other equipment, optionally mounted to the inner sides of the radiator panels 18. Blanket bodies 15 additionally or alternatively may be wrapped around external appendages of a spacecraft 10.

Protective blankets 14 provide thermal protection for the payload and also protect the payload from space-debris and electromagnetic interference (EMI). That is, protective blankets 14 are configured to provide at least three protective features—thermal protection, ballistic protection, and EMI protection. As illustrated in FIG. 1, a satellite 12 also may comprise external equipment, such as solar panels 24, communication devices 26, thrusters 28, and/or other equipment, mounted to the satellite spacecraft body 16.

With reference to FIG. 2, the plurality of sheets 30 comprises one or more sheets 32 that are composed at least in part of a carbon nanotube material and a least one sheet 34 that is composed of a different material. The voltage supply 56 is electrically coupled at least to a first sheet 33 of the one more sheets 32, such that the first sheet 33 defines a resistive heater. As an example, the voltage supply 56 may be configured to apply 100 volts across the first sheet 33. In some examples, the first sheet 33 is an outermost one of a plurality of sheets 32 that are included in the flexible blanket body 15. In such examples, while the first sheet 33 defines a resistive heater, such as for heating the payload 22 of a spacecraft 10, the other ones of the plurality of sheets 32 serve to insulate the payload 22 and in effect, direct heat from the first sheet 33 toward the payload 22. That is, in such examples, when the protective blanket 14 is installed on a spacecraft 10, the side of the flexible blanket body 15 closest to the first sheet 33 faces the inward toward the payload (e.g., the lower side in FIG. 2). The flexible blanket body 15 may directly engage the payload 22 and thereby conduct heat to the payload 22 and/or the flexible blanket body 15 may radiate heat toward the payload 22.

In some examples, as schematically and optionally illustrated in FIG. 2, the voltage supply 56 is electrically coupled to more than one sheet of the one or more sheets 32. Examples sheets 32 include those sold by Nanocomp Technologies, Inc. under the MIRALON™ brand.

Figure 4:
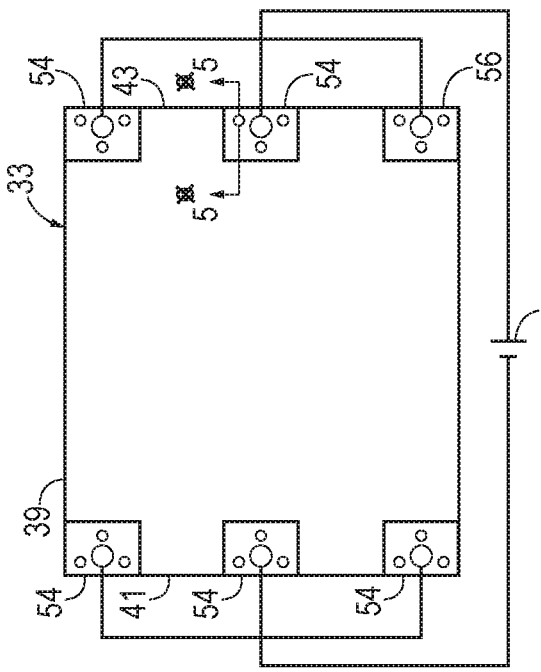
FIG. 4 is a schematic plan view representation of another example of carbon nanotube sheets of protective blankets according to the present disclosure.
Figure 3:
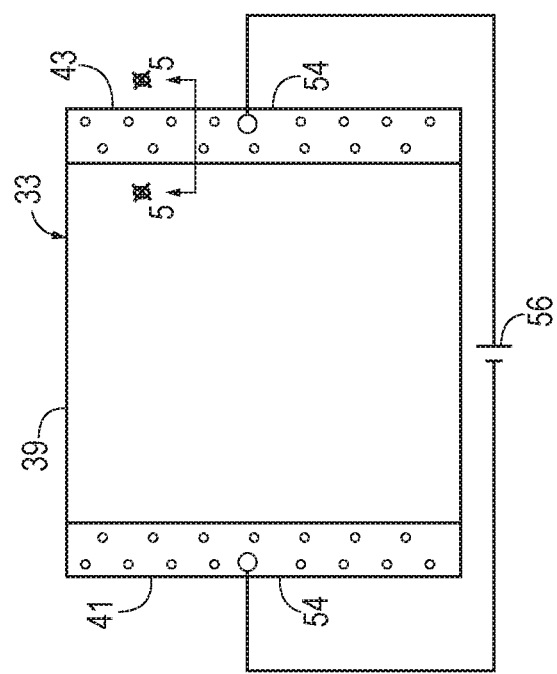
FIG. 3 is a schematic plan view representation of example of carbon nanotube sheets of protective blankets according to the present disclosure.

In some examples, as schematically represented in FIGS. 2-4, the sheet 33 comprises a carbon-nanotube-sheet body 39 and at least two terminals 54 that are operatively coupled to the carbon-nanotube-sheet body 39 adjacent to opposing edges 41, 43 of the carbon-nanotube-sheet body 39, and the voltage supply 56 is electrically coupled to the terminals 54. Accordingly, when a voltage is applied by the voltage supply 56, the voltage is applied across the sheet 33, with the carbon-nanotube-sheet body 39 acting as a resistor, and thus with the sheet 33 defining a resistive heater. Accordingly, when protective blanket 14 is operatively installed on a spacecraft 10, for example, the protective blanket 14 not only passively regulates the temperature of payload 22 by shielding the payload from solar radiation, for example, but also actively regulates the temperature of payload 22 for actively heating payload 22, such as when the corresponding side of the spacecraft 10 is not facing the sun or is otherwise shielded from the sun.

Figure 5:
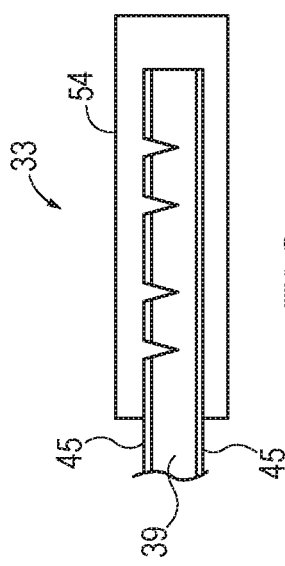
FIG. 5 is a fragmentary cross-sectional view of a portion of carbon nanotube sheets of protective blankets according to the present disclosure, taken along line 5-5 in FIGS. 3 and 4.

In some examples, as schematically represented in FIGS. 3 and 4, the terminals 54 are perforated with a plurality of spaced-apart holes to increase the mechanical and electrical connectivity between the terminals 54 and the underlying sheet 33 and carbon nanotubes 35 thereof. More specifically, as schematically represented in FIG. 5, in some examples, the terminals 54 are crimped to the carbon-nanotube-sheet body 39, with the terminals 54 extending into the carbon-nanotube-sheet body 39 to make contact with the carbon nanotubes 35 thereof. In some examples, the terminals 54 are formed from copper sheets.

In some examples, as schematically represented in FIG. 3, the sheet 33 comprises two terminals 54 that are coupled to the carbon-nanotube-sheet body 39 adjacent the opposing edges 41, 43 of the carbon-nanotube-sheet body 39. In other examples, as schematically represented in FIG. 4, the sheet 33 comprises a first set of terminals 54 coupled to and spaced along the carbon-nanotube-sheet body 39 adjacent one edge 41 and a second set of terminals 54 coupled to and spaced along the carbon-nanotube-sheet body 39 adjacent the other edge 43. Accordingly, by selecting a number of terminals 54 along each edge of a sheet 33, the sheet 33 may be customized to create desired heating profiles by allowing a variable input resistance to the sheet 33 and by varying current density capabilities of the sheet 33.

Figure 6:
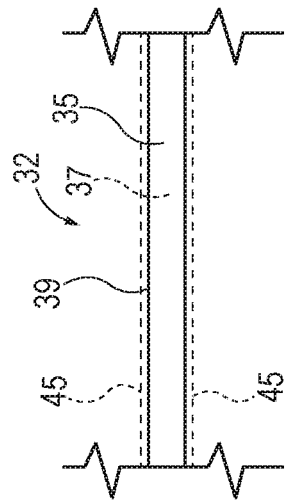
FIG. 6 is a schematic fragmentary edge view representation of example of carbon nanotube sheets of protective blankets according to the present disclosure.

With reference to FIG. 6, in some examples, at least some of the one or more sheets 32 comprise a carbon-nanotube-sheet body 39 and two boundary layers 45 that are laminated to opposing sides of the carbon-nanotube-sheet body 39. The boundary layers 45, when provided, may serve to facilitate handling and manipulation of sheets 32, as well as to provide a uniform contact surface for adjacent sheets 30 of the flexible blanket body 15. In some such examples, the boundary layers 45 are composed of a polyimide film, for example, sold by E. I. du Pont de Nemours and Company under the KAPTON™ brand. Referring back to FIG. 5, in examples of sheet 33 that comprise a terminal 54, the terminal 54 may penetrate one or both boundary layers 45 to ensure adequate contact between the terminal 54 and the carbon-nanotube-sheet body 39.

Any suitable number and configurations of sheets 32 that are composed at least in part of carbon nanotube material may be incorporated into a flexible blanket body 15, depending on design factors associated with the ultimate application of the corresponding protective blanket 14. In some examples, a flexible blanket body 15 comprises 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets 32 composed at least in part of carbon nanotube material. In some examples, a sheet 32 has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 μm. In some examples, the carbon nanotube material of a sheet 32 comprises one or more of non-woven carbon nanotubes, chopped carbon nanotube fibers, carbon nanotubes in yarn or chain form, carbon discontinuous carbon nanotubes, carbon nanotubes with an ordered orientation, carbon nanotubes with an unordered, or random, orientation, carbon nanotubes with lengths in the range of 10 μm-10 mm, and/or carbon nanotubes with diameters in the range of 1-5 μm.

In some examples, the carbon nanotube material of a sheet 32 comprises carbon nanotubes 35 within a resin matrix 37. In some examples, the resin matrix 37 is less than 40 wt %, less than 30 wt %, less than 25 wt %, greater than 10 wt %, greater than 15 wt %, greater than 20 wt %, and/or about 15-25 wt % of the carbon nanotube material. In some examples, the resin matrix 37 comprises one or more of a low modulus flexible epoxy resin matrix, a silicone based binder, polyester based binder, an epoxy matrix, a cyanate ester matrix, or a polyimide matrix or binder. In other examples, a sheet 32 comprises carbon nanotubes without a matrix or binder.

As mentioned, blanket bodies 15 comprise at least one sheet 34 that is composed of a material other than carbon nanotube material. In some examples, a protective blanket 14 comprises at least one sheet 36 that is composed at least in part of a polyaramid material and/or a polyimide material. In some such examples, at least one sheet 36 is a metallized polyimide film. When provided, a sheet 36 acts as a radiation barrier for the sheet(s) 33, keeping the heat in and spreading it uniformly across the flexible blanket body 15, and as a radiation barrier for the outside environment, keeping the hardware being heated by the protective blanket 14 in its own thermal environment. Any suitable number and configurations of sheets 36 may be incorporated into a flexible blanket body 15. In some examples, one or more sheets 36 comprise a fabric of woven polyaramid and/or polyimide reinforced composite material. Additionally or alternatively, in some examples, one or more sheets 36 are composed of polyaramid and/or polyimide reinforced composite material, such as that comprises polyaramid and/or polyimide fibers and a binding material. In some examples, a flexible blanket body 15 comprises 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets 36 composed at least in part of polyaramid and/or polyimide material. In some examples, a sheet 36 has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm. The polyaramid and/or polyimide material of a sheet 30 may include KEVLAR™ material and/or NOMEX™ material, for example. When a sheet 36 is composed of a polyaramid and/or polyimide reinforced composite material, the polyaramid and/or polyimide reinforced composite material may comprise a polyester binding, for example.

As used herein, a "reinforced composite material" refers to materials that include a matrix or binder material (such as a polymer, polyester, silicone, or epoxy binder) together with a filler. The filler may be fibers, particulates, or other configurations of material depending on the desired properties of the reinforced composite material and thus the desired properties of the corresponding sheet. Moreover, the filler may be ordered, such as woven fibers or longitudinally aligned fibers, or the filler may be disordered, such as randomly ordered.

In some examples, a plurality of sheets 32 are interleaved (i.e., alternate) with a plurality of sheets 36, such schematically represented in FIG. 2.

Additionally or alternatively, in some examples, a flexible blanket body 15 comprises at least one sheet 38 that is composed of carbon filled composite material. When provided, a sheet 38 acts as an electrostatic dissipater, a protective/handling layer, and an outmost optical layer. The carbon loading of a sheet 38 allows the sheet 38 to dissipate electrostatic build-up and dissipate it to spacecraft ground. The thickness and reinforcement of the sheet 38 allow it to be handled and manipulated without causing damage to the flexible blanket body 15. The carbon loading and black color give it the optical (reflectivity and absorptance) properties to contribute to the thermal management of the structure being protected and heated by the protective blanket 14. Any suitable number and configurations of sheets 38 may be incorporated into a protective blanket 14. In some examples, a flexible blanket body 15 comprises 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets 38 composed of carbon filled composite material. In some examples, a sheet 38 has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm. In some examples, the carbon filled composite material of a sheet 38 comprises a carbon fiber filled polyimide and/or a carbon fiber loaded KAPTON™ material. In some examples, sheets 38 define the outer layers of the plurality of sheets 30, as schematically represented in FIG. 2.

Additionally or alternatively, in some examples, a flexible blanket body 15 comprises at least one sheet 40 that is composed of metal mesh. When provided, a sheet 40 acts as Faraday shield. Any suitable number and configurations of sheets 40 may be incorporated into a flexible blanket body 15. In some examples, a flexible blanket body 15 comprises 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets 40 composed of metal mesh. In some examples, a sheet 40 has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm. In some examples, the metal mesh of a sheet 40 comprises aluminum and/or copper, for example. The metal mesh of a sheet 40 may comprise pores having a maximum dimension in the range of 1-10 mm, for example. The metal mesh of a sheet 40 may comprise pores that are spaced apart in the range of 1-10 mm, for example.

As mentioned, any suitable number of sheets 30, sheets 32, and sheets 34 may be incorporated into a flexible blanket body 15, for example, depending on the desired properties of and application for the protective blanket 14. In some examples, more than one sheet of a particular configuration are positioned directly together, that is, with two or more sheets composed of the same material being stacked together. Additionally or alternatively, in some examples, one configuration of sheet are interleaved with another configuration of sheet, that is, with two configurations of sheets being stacked together in an alternating fashion, such as discussed above in connection with sheets 32 and sheets 36. Additionally or alternatively, in some examples, more than two configurations of sheets are stacked in an alternating fashion, including the sequential stacking of three, four, or more than four sheets composed of different materials. Additionally or alternatively, in some examples, one particular configuration of a sheet is stacked as an outer layer of a flexible blanket body 15. Additionally or alternatively, in some examples, one particular configuration of a sheet is stacked as both outer layers of a flexible blanket body 15, that is, defining both outermost layers of the flexible blanket body 15. Other configurations of stacking sheets 30 also are within the scope of the present disclosure, and blanket bodies 15 are not limited to the specific examples described herein.

In FIG. 2, the schematically illustrated fourteen sheets 30 represent one example of a protective blanket 14, with the dashed lead lines on the right side of the figure identifying an optional order of sheets 30. Specifically, as indicated, an example flexible blanket body 15 comprises six sheets 32 composed at least in part of carbon nanotube material interleaved with six sheets 36 composed at least in part of a polyimide material, and with two sheets 38 composed of carbon filled composite material defining the outer layers of the flexible blanket body 15.

The sheets 30 of a flexible blanket body 15 are coupled together in any suitable fashion to define the flexible blanket body 15. In some examples, such as schematically represented by the vertical dashed lines in FIG. 2, the sheets 30 are coupled together at spaced-apart points across the protective blanket. For example, the sheets 30 may be coupled together by stitching, sewing, tacking, or otherwise fastening the sheets together, such as with fiberglass and/or nylon thread, with pressure sensitive adhesive, and/or with hook and pile fasteners. In some such examples, the flexible blanket body 15 may be described as being quilted. Alternatively, in other examples, the sheets 30 of a protective blanket are coupled together only at their perimeters. Additionally or alternatively, one or more of the sheets 30, including optionally all of the sheets 30, in some examples, are co-laminated or otherwise adhered together across their entireties, or substantially across their entireties. Other examples of coupling together a plurality of sheets 30 to form a protective blanket 14 also are within the scope of the present disclosure.

As schematically and optionally illustrated in FIG. 2, some examples of protective blankets 14 also comprise one or more attachment mechanisms 50 operatively coupled to an outer one of the sheets 30 of the flexible blanket body 15. When present, an attachment mechanism 50 is configured to operatively couple the flexible blanket body 15 to a spacecraft body 16. For example, an attachment mechanism 50 may comprise a hook and pile fastener that extends adjacent at least a portion of, optionally substantially all of, optionally all of, a perimeter of one side of the flexible blanket body 15. In some examples, as schematically and optionally illustrated in FIG. 2, two spaced-apart attachment mechanisms 50, optionally in the form of hook and pile fasteners, extend adjacent at least a portion of, optionally substantially all of, optionally all of, a perimeter of one side of the flexible blanket body 15.

Additionally or alternatively, as also schematically and optionally illustrated in FIG. 2, in some examples, a flexible blanket body 15 comprises a sealing mechanism 52 that is operatively coupled to an outer one of the sheets 30. When present, a sealing mechanism 52 is configured to operatively seal against a spacecraft body 16. In some such examples, a sealing mechanism 52 comprises or is in the form of one or more of a gasket, an O-ring, an adhesive, etc. that extends adjacent at least a portion of, optionally substantially all of, optionally all of, a perimeter of one side of the flexible blanket body 15. In some examples, as schematically and optionally illustrated in FIG. 2, a sealing mechanism 52 is positioned between two spaced-apart attachment mechanism 50, such as portions of a hook and pile fastener around the perimeter of one side of a flexible blanket body 15.

Figure 7:
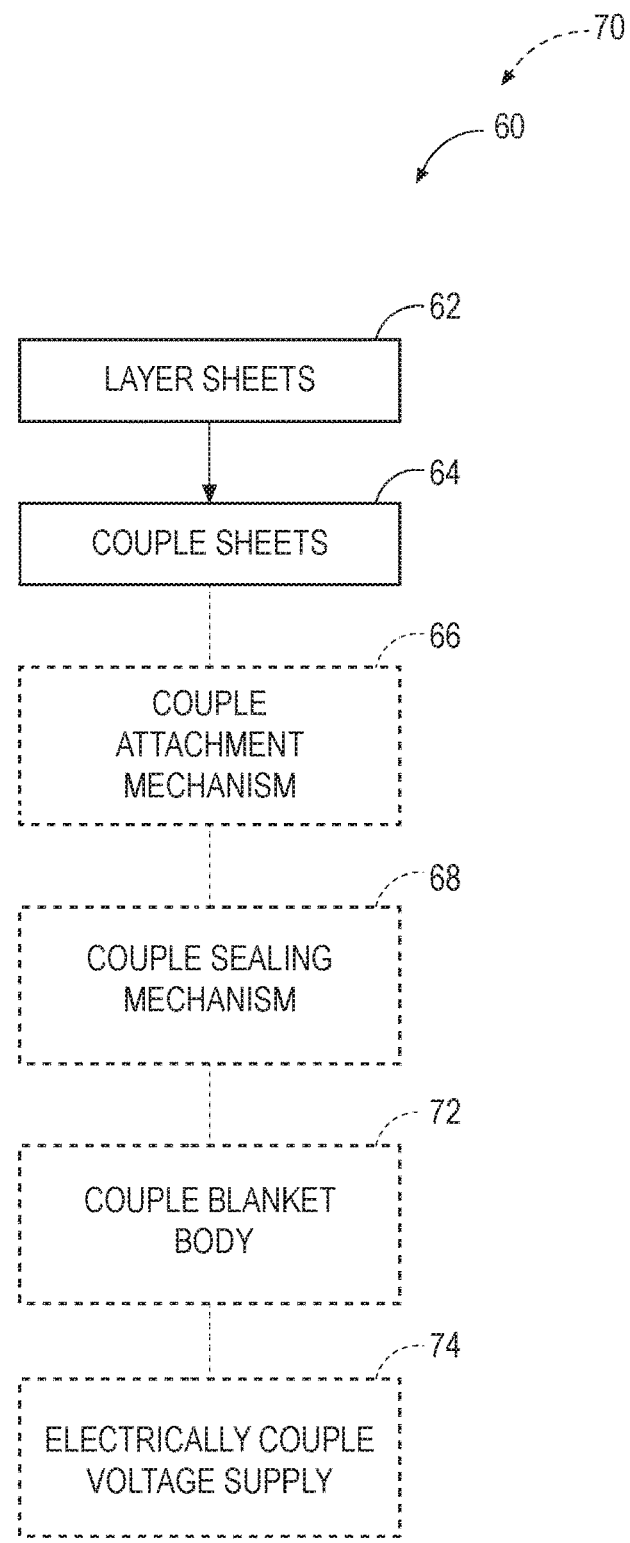
FIG. 7 is a flowchart schematically representing methods according to the present disclosure.

FIG. 3 schematically provides a flowchart that represents illustrative, non-exclusive examples of methods according to the present disclosure. In FIG. 7, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 7 are not limiting and other methods and steps are within the scope of the present disclosure, including methods having greater than or fewer than the number of steps illustrated, as understood from the discussions herein.

As schematically illustrated in solid boxes in FIG. 7, methods 60 of assembling a protective blanket 14 comprise layering, or stacking, a plurality of sheets 30, as indicated at 62, and operatively coupling together the sheets 30, as indicated at 64. In some examples, the operatively coupling together 64 comprises coupling together the sheets 30 at spaced-apart points across the flexible blanket body 15 of the protective blanket 14. In some such examples, the sheets are sewn, stitched, tacked, or otherwise fastened together around the edges of the flexible blanket body 15 and/or at spaced-apart intervals across the span of the flexible blanket body 15, such as with fiberglass or nylon thread, with pressure sensitive adhesive, and/or with hook and pile fasteners.

As schematically and optionally illustrated in FIG. 7 at 66, some methods 60 additionally comprise coupling an attachment mechanism 50 to an outer one of the sheets 30, with the attachment mechanism 50 being configured to operatively couple the flexible blanket body 15 to a spacecraft body 16.

As also schematically and optionally illustrated in FIG. 7 at 68, some methods 60 additionally or alternatively comprise coupling a sealing mechanism 52 to an outer one of the sheets 30, with the sealing mechanism 52 being configured to operatively seal against a spacecraft body 16.

Methods 70 of assembling a spacecraft 10 also are within the scope of the present disclosure. Some methods 70 comprise coupling a flexible blanket body 15 of a protective blanket 14 to a spacecraft body 16, as indicated at 72, and electrically coupling a voltage supply 56 to at least one sheet 30 of the flexible blanket body 15. Some methods 70 also comprise performing a method 60 of assembling the protective blanket 14 prior to the operatively coupling 72 and the electrically coupling 74.

Illustrative, non-exclusive examples of inventive subject matter according to the present disclosure are described in the following enumerated paragraphs:

A. A protective blanket for a spacecraft, the protective blanket comprising:

a flexible blanket body comprising a plurality of sheets of material operatively coupled together to define the flexible blanket body, wherein the plurality of sheets comprises one or more sheets composed at least in part of a carbon nanotube material and at least one sheet composed of a different material; and a voltage supply electrically coupled at least to a first sheet of the one or more sheets composed at least in part of the carbon nanotube material, such that the first sheet defines a resistive heater.

A1. The protective blanket of paragraph A, wherein the first sheet comprises:

a carbon-nanotube-sheet body; and at least two terminals operatively coupled to the carbon-nanotube-sheet body adjacent opposing edges of the carbon-nanotube-sheet body, and wherein the voltage supply is electrically coupled to the at least two terminals.

A1.1. The protective blanket of paragraph A1, wherein the at least two terminals are crimped to the carbon-nanotube-sheet body.

A1.2. The protective blanket of any of paragraphs A1-A1.1, wherein the at least two terminals consist of two terminals coupled to the carbon-nanotube-sheet body adjacent the opposing edges of the carbon-nanotube-sheet body.

A1.3. The protective blanket of any of paragraphs A1-A1.1, wherein the at least two terminals comprise:

a first set of terminals coupled to and spaced along the carbon-nanotube-sheet body adjacent one edge of the opposing edges of the carbon-nanotube-sheet body; and a second set of terminals coupled to and spaced along the carbon-nanotube-sheet body adjacent the other edge of the opposing edges of the carbon-nanotube-sheet body.

A2. The protective blanket of any of paragraphs A-A1.3, wherein the one or more sheets composed at least in part of the carbon nanotube material each comprises:

a/the carbon-nanotube-sheet body; and boundary layers laminated to opposing sides of the carbon-nanotube-sheet body.

A2.1. The protective blanket of paragraph A2, wherein the boundary layers are composed of a polyimide film.

A2.2. The protective blanket of any of paragraphs A2-A2.1 when depending from paragraph A1.1, wherein the at least two terminals are crimped to the first sheet and penetrate at least one of the boundary layers.

A3. The protective blanket of any of paragraphs A-A2.2, wherein the one or more sheets composed at least in part of the carbon nanotube material comprises 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets composed at least in part of the carbon nanotube material.

A4. The protective blanket of any of paragraphs A-A3, wherein the one or more sheets composed at least in part of the of carbon nanotube material has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 μm.

A5. The protective blanket of any of paragraphs A-A4, wherein the carbon nanotube material comprises, optionally consists of, optionally consists essentially of, one or more of non-woven carbon nanotubes, chopped carbon nanotube fibers, carbon nanotubes in yarn or chain form, carbon discontinuous carbon nanotubes, carbon nanotubes with an ordered orientation, carbon nanotubes with an unordered, or random, orientation, carbon nanotubes with lengths in the range of 10 μm-10 mm, and/or carbon nanotubes with diameters in the range of 1-5 μm.

A6. The protective blanket of any of paragraphs A-A5, wherein the carbon nanotube material comprises carbon nanotubes within a resin matrix.

A6.1. The protective blanket of paragraph A6, wherein the resin matrix is less than 40 wt %, less than 30 wt %, less than 25 wt %, greater than 10 wt %, greater than 15 wt %, greater than 20 wt %, and/or about 15-25 wt % of the carbon nanotube material.

A6.2. The protective blanket of any of paragraphs A6-A6.1, wherein the resin matrix comprises, optionally consists of, optionally consists essentially of, one or more of a low modulus flexible epoxy resin matrix, a silicone based binder, a polyester based binder, an epoxy matrix, or a cyanate ester matrix.

A7. The protective blanket of any of paragraphs A-A6.2, wherein the plurality of sheets further comprises at least one sheet composed at least in part of a polyaramid material and/or a polyimide, optionally a polyaramid and/or polyimide reinforced composite material.

A7.1. The protective blanket of paragraph A7, wherein the at least one sheet composed at least in part of a polyaramid material and/or a polyimide material is a metallized polyimide film.

A7.2. The protective blanket of any of paragraphs A7-A7.1, wherein the at least one sheet composed at least in part of the polyaramid material and/or the polyimide material comprises a fabric of woven polyaramid and/or polyimide material.

A7.3. The protective blanket of any of paragraphs A7-A7.2, wherein the at least one sheet composed at least in part of the polyaramid material and/or the polyimide material comprises 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets composed at least in part of the polyaramid material and/or the polyimide material.

A7.4. The protective blanket of any of paragraphs A7-A7.3, wherein the at least one sheet composed at least in part of the polyaramid material and/or the polyimide material has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 μm.

A7.5. The protective blanket of any of paragraphs A7-A7.4, wherein the polyaramid and/or polyimide material comprises, optionally consists of, optionally consists essentially of, KEVLAR™ material and/or NOMEX™ material.

A7.6. The protective blanket of any of paragraphs A7-A7.5, wherein the polyaramid and/or the polyimide reinforced composite material comprises, optionally consists of, optionally consists essentially of, a polyester binding.

A7.7. The protective blanket of any of paragraphs A7-A7.6,
wherein the at least one sheet composed at least in part of the polyaramid material and/or the polyimide material comprises a plurality of sheets composed at least in part of the polyaramid material and/or the polyimide material;
wherein the one or more sheets composed at least in part of the carbon nanotube material comprises a plurality of sheets composed at least in part of the carbon nanotube material interleaved with the plurality of sheets composed at least in part of the polyaramid material and/or the polyimide material.

A8. The protective blanket of any of paragraphs A-A7.7, wherein the plurality of sheets further comprises at least one sheet composed of carbon filled composite material.

A8.1. The protective blanket of paragraph A8, wherein the at least one sheet composed of carbon filled composite material comprises 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets composed of carbon filled composite material.

A8.2. The protective blanket of any of paragraphs A8-A8.1, wherein the at least one sheet composed of carbon filled composite material has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 μm.

A8.3. The protective blanket of any of paragraphs A8-A8.2, wherein the carbon filled composite material comprises, optionally consists of, optionally consists essentially of, carbon fiber filled polyimide and/or a carbon fiber loaded KAPTON™ material.

A8.4. The protective blanket of any of paragraphs A8-A8.3, wherein the at least one sheet composed of carbon filled composite material defines outer layers of the plurality of sheets.

A9. The protective blanket of any of paragraphs A-A8.4, wherein the plurality of sheets further comprises at least one sheet composed of metal mesh.

A9.1. The protective blanket of paragraph A9, wherein the at least one sheet composed of metal mesh comprises 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets composed of metal mesh.

A9.2. The protective blanket of any of paragraphs A9-A9.1, wherein the at least one sheet composed of metal mesh has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 μm.

A9.3. The protective blanket of any of paragraphs A9-A9.2, wherein the metal mesh comprises, optionally consists of, optionally consists essentially of, aluminum and/or copper.

A9.4. The protective blanket of any of paragraphs A9-A9.3, wherein the metal mesh comprises, optionally consists of, optionally consists essentially of, pores having a maximum dimension in the range of 1-10 mm.

A9.5. The protective blanket of any of paragraphs A9-A9.4, wherein the metal mesh comprises, optionally consists of, optionally consists essentially of, pores that are spaced apart in the range of 1-10 mm.

A10. The protective blanket of any of paragraphs A-A9.5, wherein the plurality of sheets of material is coupled together at spaced-apart points across the protective blanket.

A11. The protective blanket of any of paragraphs A-A10, further comprising:

an attachment mechanism operatively coupled to an outer one of the plurality of sheets, wherein the attachment mechanism is configured to operatively couple the protective blanket to a body of a spacecraft.

A11.1. The protective blanket of paragraph A11, wherein the attachment mechanism comprises a hook and pile fastener extending adjacent at least a portion of, optionally substantially all of, optionally all of, a perimeter of one side of the protective blanket.

A12. The protective blanket of any of paragraphs A-A11.1, further comprising:

a sealing mechanism operatively coupled to an/the outer one of the plurality of sheets, wherein the sealing mechanism is configured to operatively seal against a/the body of a/the spacecraft.

A12.1. The protective blanket of paragraph A12, wherein the sealing mechanism comprises a gasket extending adjacent at least a portion of, optionally substantially all of, optionally all of, a/the perimeter of one side of the protective blanket.

A12.1.1. The protective blanket of paragraph A12.1 when depending from paragraph A11.1, wherein the hook and pile fastener comprises two spaced-apart portions, and wherein the gasket is positioned between the two spaced-apart portions.

A13. The use of the protective blanket of any of paragraphs A-A12.1.1, optionally for protecting a spacecraft.

A14. A spacecraft, comprising:

a spacecraft body; and the protective blanket of any of paragraphs A-A12.1.1, wherein the flexible blanket body of the protective blanket is operatively coupled to the spacecraft body.

A14.1. The spacecraft of paragraph A14, wherein the spacecraft body comprises two spaced-apart radiator panels, and wherein the flexible blanket body extends at least partially around and at least partially encloses a volume between the two spaced-apart radiator panels.

A14.2. The spacecraft of any of paragraphs A14-A14.1., wherein the spacecraft body comprises an external appendage, and wherein the flexible blanket body is wrapped around the external appendage.

B. A flexible blanket body for a spacecraft, the flexible blanket body comprising:

a plurality of sheets of material operatively coupled together to define the flexible blanket body, wherein the plurality of sheets comprises one or more sheets composed at least in part of a carbon nanotube material and at least one sheet composed of a different material;

wherein at least a first sheet of the one or more sheets composed at least in part of the carbon nanotube material comprises:

a carbon-nanotube-sheet body; and at least two terminals operatively coupled to the carbon-nanotube-sheet body adjacent opposing edges of the carbon-nanotube-sheet body, wherein the at least two terminals are configured to be electrically coupled to a voltage supply, such that the first sheet defines a resistive heater.

B1. The flexible blanket body of paragraph B, further comprising the subject matter of any of paragraphs A-A12.1.1.

C. A method of assembling the protective blanket of any of paragraphs A-A12.1.1, the method comprising:

layering the plurality of sheets; and operatively coupling together the plurality of sheets.

C1. The method of paragraph C, wherein the operatively coupling together comprises coupling together at spaced-apart points across the flexible blanket body.

C2. The method of any of paragraphs C-C1, wherein the operatively coupling together comprises stitching, sewing, tacking, or otherwise fastening the plurality of sheets together, such as with fiberglass and/or nylon thread, with pressure sensitive adhesive, and/or with hook and pile fasteners.

C3. The method of any of paragraphs C-C2, further comprising:

coupling an attachment mechanism to an outer one of the plurality of sheets, wherein the attachment mechanism is configured to operatively couple the flexible blanket body to a spacecraft body.

C4. The method of any of paragraphs C-C3, further comprising:

coupling a sealing mechanism to an/the outer one of the plurality of sheets, wherein the sealing mechanism is configured to operatively seal against a/the spacecraft body.

D. A method of assembling a spacecraft, the method comprising:

coupling the protective blanket of any of paragraphs A-A12.1.1 to a/the spacecraft body.

D1. The method of paragraph D, further comprising:

prior to the operatively coupling the protective blanket, performing the method of any of paragraphs C-C4.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A protective blanket for a spacecraft, the protective blanket comprising:
a flexible blanket body comprising a plurality of sheets of material operatively coupled together to define the flexible blanket body, wherein the plurality of sheets comprises one or more sheets composed at least in part of a carbon nanotube material and at least one sheet composed of a different material; and
a voltage supply electrically coupled at least to a first sheet of the one or more sheets composed at least in part of the carbon nanotube material, such that the first sheet defines a resistive heater;
wherein the first sheet comprises:
a carbon-nanotube-sheet body;
a first set of terminals coupled to and spaced along the carbon-nanotube-sheet body adjacent one edge of the carbon-nanotube-sheet body; and
a second set of terminals coupled to and spaced along the carbon-nanotube-sheet body adjacent an opposite edge of the carbon-nanotube-sheet body.

2. The protective blanket of claim 1, wherein the first set of terminals and the second set of terminals are crimped to the carbon-nanotube-sheet body.

3. The protective blanket of claim 1, wherein the first set of terminals and the second set of terminals each consist of two terminals.

4. The protective blanket of claim 1, wherein the one or more sheets composed at least in part of the carbon nanotube material each comprises:
the carbon-nanotube-sheet body; and
boundary layers laminated to opposing sides of the carbon-nanotube-sheet body.

5. The protective blanket of claim 4, wherein the boundary layers are composed of a polyimide film.

6. The protective blanket of claim 1, wherein the carbon nanotube material comprises non-woven carbon nanotubes.

7. The protective blanket of claim 6, wherein the carbon nanotube material comprises the non-woven carbon nanotubes within a resin matrix.

8. The protective blanket of claim 7, wherein the resin matrix is 15-25 wt % of the carbon nanotube material.

9. The protective blanket of claim 8, wherein the resin matrix comprises a flexible epoxy resin matrix.

10. The protective blanket of claim 1, wherein the plurality of sheets further comprises at least one sheet composed at least in part of a polyimide material.

11. The protective blanket of claim 10, wherein the at least one sheet composed at least in part of the polyimide material is a metallized polyimide film.

12. The protective blanket of claim 10,
wherein the at least one sheet composed at least in part of the polyimide material comprises a plurality of sheets composed at least in part of the polyimide material; and
wherein the one or more sheets composed at least in part of the carbon nanotube material comprises a plurality of sheets composed at least in part of the carbon nanotube material interleaved with the plurality of sheets composed at least in part of the polyimide material.

13. The protective blanket of claim 1, wherein the plurality of sheets of material further comprises at least one sheet composed of carbon filled composite material.

14. The protective blanket of claim 13, wherein the at least one sheet composed of carbon filled composite material defines outer layers of the plurality of sheets of material.

15. A spacecraft, comprising:
a spacecraft body; and
the protective blanket of claim 1, wherein the flexible blanket body of the protective blanket is operatively coupled to the spacecraft body.

16. A protective blanket for a spacecraft, the protective blanket comprising:
a flexible blanket body comprising a plurality of sheets of material operatively coupled together to define the flexible blanket body, wherein the plurality of sheets comprises:
a plurality of sheets composed at least in part of a carbon nanotube material; and
a plurality of sheets composed of a metallized polyimide film interleaved with the plurality of sheets composed at least in part of the carbon nanotube material; and
a voltage supply electrically coupled at least to a first sheet of the plurality of sheets composed at least in part of the carbon nanotube material, such that the first sheet defines a resistive heater.

17. A protective blanket for a spacecraft, the protective blanket comprising:
a flexible blanket body comprising a plurality of sheets of material operatively coupled together to define the flexible blanket body, wherein the plurality of sheets comprises one or more sheets composed at least in part of a carbon nanotube material and at least one sheet composed of a different material; and
a voltage supply electrically coupled at least to a first sheet of the one or more sheets composed at least in part of the carbon nanotube material, such that the first sheet defines a resistive heater;
wherein the plurality of sheets further comprises a plurality of sheets composed at least in part of a polyimide material; and
wherein the one or more sheets composed at least in part of the carbon nanotube material comprises a plurality of sheets composed at least in part of the carbon nanotube material interleaved with the plurality of sheets composed at least in part of the polyimide material.

18. The protective blanket of claim 17, wherein the first sheet has varying current density capabilities, wherein the first sheet comprises a first set of terminals coupled to and spaced along one edge of the first sheet, wherein the first sheet comprises a second set of terminals coupled to and spaced along an opposite edge of the first sheet, and wherein the voltage supply is electrically coupled to the first set of terminals and to the second set of terminals.

19. A spacecraft, comprising:
a spacecraft body; and
the protective blanket of claim 17, wherein the flexible blanket body of the protective blanket is operatively coupled to the spacecraft body.

20. The protective blanket of claim 1, wherein the carbon-nanotube-sheet body has varying current density capabilities, and wherein the voltage supply is electrically coupled to the first set of terminals and to the second set of terminals.

21. The protective blanket of claim 16, wherein the first sheet has varying current density capabilities, wherein the first sheet comprises a first set of terminals coupled to and spaced along one edge of the first sheet, wherein the first sheet comprises a second set of terminals coupled to and spaced along an opposite edge of the first sheet, and wherein the voltage supply is electrically coupled to the first set of terminals and to the second set of terminals.

22. A spacecraft, comprising:
   a spacecraft body; and
      the protective blanket of claim 16, wherein the flexible blanket body of the protective blanket is operatively coupled to the spacecraft body.

\* \* \* \* \*